Sept. 17, 1963  B. A. SHOOR  3,104,335
ACCELEROMETER
Filed Feb. 12, 1960

INVENTOR.
BERNARD A. SHOOR
BY
ATTORNEY

United States Patent Office 3,104,335
Patented Sept. 17, 1963

3,104,335
ACCELEROMETER
Bernard A. Shoor, Pasadena, Calif., assignor to Endevco Corporation, Pasadena, Calif., a corporation of California
Filed Feb. 12, 1960, Ser. No. 8,443
10 Claims. (Cl. 310—8.4)

This invention relates to improvements in accelerometers and particularly to accelerometers employing piezoelectric material for generating electrical signals in accordance with accelerations or vibrations to be detected.

In an accelerometer to which this invention applies, an annular or similarly contoured piezoelectric sensing element is mounted in a cylindrical or other peripheral case or housing providing a chamber for the element. One face of the sensing element mounted in the mentioned chamber is positioned in fixed relationship with respect to a walled housing, and another opposite face of the crystal is in contact with an annular or peripheral inertial member or mass. The piezoelectric crystal element is connected to an electric circuit for detecting, indicating or recording electrical signals generated by the piezoelectric element in response to accelerations or vibrations of the case or housing in a direction parallel to the central or concentric axis of the accelerometer when the latter is mounted upon a vibrating object. The crystal element is polarized with its polarization axis parallel to its central axis and to the axis of the housing.

In the best embodiment of this invention known at this time, the annular piezoelectric crystal element is mounted in the shear mode between a central part of the casing and an annular inertial member. By polarizing the piezoelectric element and disposing its axis of polarization parallel to the axis of vibration of the vibrating object, and by mounting the piezoelectric element in shear relationship between the housing and the inertial member as indicated, the accelerometer develops charges at the two concentric cylindrical faces when subjected to longitudinal, or axial shearing forces. With this arrangement, very low cross-axis sensitivity can be attained and the resonance characteristics of the system are little affected by the resonance characteristics of the case.

An important object of this invention is to provide an accelerometer unit constructed to be plugged into an accelerometer mounting in tight relationship for operation, and yet removable for replacement, such plug-in unit being installable through the medium of thread constructions or otherwise as appropriate. Such units are capable of being manufactured in quantity, so that they may be readily installed at a later time in whatever type of mounting or outer housing as may be required for the filling of any special order or orders, Another object of the invention is to provide in structures for accelerometers of the indicated character employing inertial mass members in contact with piezoelectric crystal members, an arrangement in which a structural supporting portion carrying a crystal is so mounted with respect to a principal mounting portion of a housing as to afford a stress relief gap between the mentioned supporting portion and the principal housing or mounting wall thereof to avoid the transmission of stresses or strains which might otherwise be transferred from the principal housing to the piezoelectric crystal member. When substantial stresses and strains are imparted to support members for piezoelectric crystals cooperating with inertial mass members, and especially when such piezoelectric crystals and the inertial mass members are annular or circular in configuration, such stresses and strains as are imparted by turning or otherwise forcing such support members onto seats in accelerometer structures tend to introduce spurious signals from the piezoelectric crystals, especially where mounted in the shear mode. Such spurious signals often arise because such stresses and strains introduce cross-axis sensitivity.

Such stress relief gaps are especially needed in accelerometers of the indicated nature where the piezoelectric crystal elements and their inertial members have annular constructions.

Stress relief gaps, as above indicated, are formed in the forms of the invention here illustrated which are all of annular configuration by providing support members rigidly affixed to the accelerometer housings along mounting edges thereof in spaced relationship to the principal housings whereby to leave spaces or gaps between such principal housings and the mentioned supporting portions for the piezoelectric crystals. In the preferred forms hereof, each housing is circular or annular and in the nature of a cylinder, and the supporting portion is also annular or in the form of a cylinder concentric with the housing per se whereby to provide a concentric annular stress relief gap. This supporting housing portion carries, fixed thereon, an annular piezoelectric crystal, such piezoelectric crystal in turn carrying the concentric cylindrical inertial or mass member fixed thereon.

A still further object of the invention is to provide an accelerometer construction wherein the various parts thereof, including the electrical connectors, are concentrically arranged with respect to one another about a central axis of the device. Such construction is accomplished by disposing a central conductor at the central axis of the accelerometer housing and resiliently mounting a concentric interial mass member about said axis, and providing an electrical element for detecting relative movement of the inertial member and the housing. The housing and the central conductor are connected to opposite terminals of an electrical element that generates a signal in accordance with relative movement of the case and the inertial member. In the best embodiment of the invention, a piezoelectric crystal is employed both as a sensing element and as a resilient support for the inertial member, and in this case, the housing and inertial member are electrically connected to opposite faces of the crystal and the conductor element is directed radially outwardly within the chamber to connect with the intertial mass member.

Other objects of the invention and various features of construction thereof will become apparent to those skilled in this art upon reference to the following specification and the accompanying drawing wherein a preferred form of the invention is illustrated.

Figures 1, 2, 3, 4:
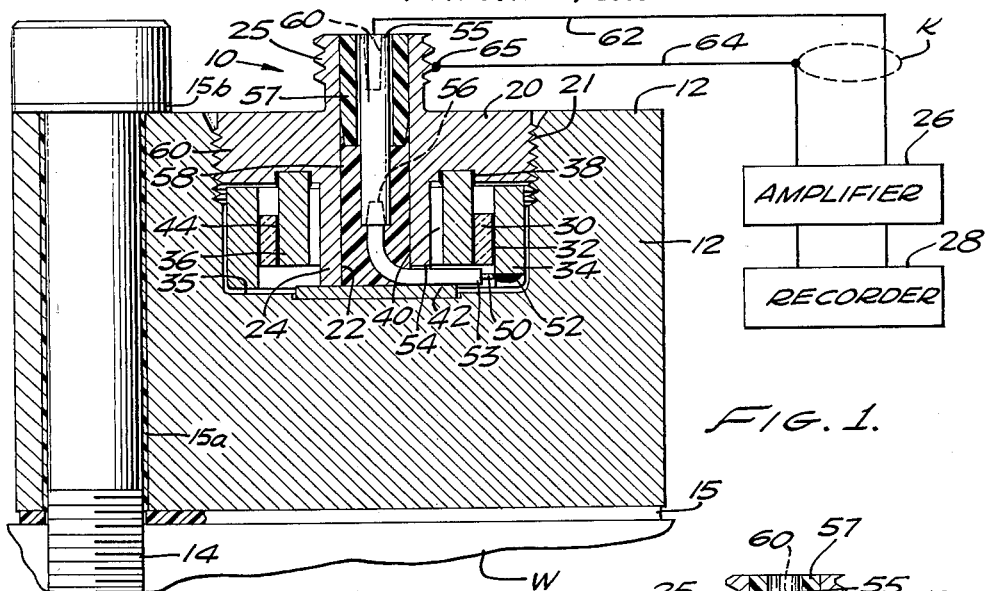
FIGURE 1 is in part an enlarged vertical transverse section through an accelerometer approximately as indicated by the line 1—1 of FIG. 2, and in part a diagrammatic showing of the electrical connection with an amplifier and recorder representing means for indicating electrical output generated by the accelerometer.
FIG. 2 is a perspective view indicating how a plug-in type of accelerometer of FIG. 1 may be employed in a tri-axial accelerometer mounting.
FIG. 3 is a vertical transverse section showing a modification constructed for mounting in operative position through the medium of an insulating stud.
FIG. 4 is principally a vertical transverse section illustrating another use of the plug-in structure of this improvement.

For the purpose of simplifying the description, each of the structures in FIGS. 1, 3 and 4 is assumed to be mounted upon a vertical axis, although it is apparent that such accelerometer units may be mounted with their axes otherwise disposed, as represented by the two units at two of the sides of the mounting block of FIG. 2.

Each of these plug-in units, which is generally indicated at 10 in each figure, is mounted in an appropriate mounting member or outer housing which is variable in construction according to the particular use to which it is to be put.

In FIGURE 1, this mounting is a block 12, which block 12 may be the metallic block 12 illustrated in FIG. 2 as carrying three units on different central axes. As seen in FIG. 1, the block 12 is mounted upon any device or mechanism or other piece of work W through the medium of a bolt or a machine screw 14, an appropriate washer or insulating member 15 being positioned between the block 12 and the work W. An insulating sleeve 15a encircling the bolt 14 and an insulating washer 15b at the upper end of the block 12 complete the insulation.

Each of the units 10 mentioned includes a principal metallic housing member 20 which is provided with external threads 21 for threading or plugging into the block 12. The housing member 20, which is circular, is provided with an axial bore 22 for the reception of an electrical conductor as presently to be described, this bore being surrounded by an open-ended sleeve 24 constituting a lower portion of the housing member 20 and by the main body portion of the housing member 20. The housing 20 has at its upper end a threaded fitting 25 adapted to receive a coupling of a conventional coaxial cable indicated schematically at K which leads to an amplifier 26 and a recorder 28.

The electrical output required of the accelerometer is generated through the medium of an annular piezoelectric element 30 which, in the form illustrated, constitutes a short cylindrical crystal section. The annular piezoelectric crystal member 30 is rigidly secured to the outer annular face of a metallic annular support or carrier ring 36 constituting a short cylindrical section whose upper end is rigidly secured, as by brazing, in an annular recess 38 formed in the upper or inner face of the body portion of the housing member 20. The annular supporting member 36 has its inner cylindrical wall separated from the sleeve 24 by an annular stress-relief gap 40. The outer peripheral face of the piezoelectric crystal element 30 has rigidly secured thereto, as by means of any suitably conductive cement layer 32, a metallic annular inertial or mass member 34 which also is in the form of a short cylindrical section.

As illustrated, the plug-in sub-assembly unit of this invention, which includes the annular piezoelectric crystal 30 and the annular inertial member 34 and the upper threaded portion of the housing member 20, are received in a cylindrical chamber or cavity 35 in the mounting block 12, such cavity being disposed around the sleeve portion 24 of such housing member 20. The lower end of the sleeve 24 is positioned immediately above a steel bearing plate 42 counter-sunk into the bottom of the well of the cavity 35. The bearing plate 42 provides a firm seat for the sleeve 24 when turned down tight into operative position. In the form illustrated, the bearing plate 42 has an overall diameter less than the diameter of the inertial member 34 to clear the latter, the annular piezoelectric crystal member 30 and the support 36 being disposed above the level of the upper surface of the bearing plate 42.

With the described arrangement, when the housing member 20 and its integral depending sleeve 24 are turned down into operative engagement with the steel plate or disc 42, the stress-relief gap 40 serves to prevent the transmission of strains upon the sleeve 24 to the annular support 36 and thence to the piezoelectric crystal 30. This feature is of considerable importance because, otherwise, stresses impressed upon the sleeve 24 would strain the annular crystal element thereby modifying its piezoelectric characteristics. As a result in some cases cross-axis sensitivity would be introduced or increased thereby causing spurious signals to be generated when the accelerometer is subjected to forces acting transversely of its axis. By the present construction, the crystal 30 is in effect mechanically isolated or insulated from such stresses by the interposition of the annular space or gap 40. This arrangement has the further advantage in that such stresses could, if transferred to the piezoelectric crystal 30, affect temperature sensitivity. Also, by this structural arrangement, the inertial member 34, together with the crystal element 30, is freely suspended from the annular metal support 36, the piezoelectric crystal 30 being rigidly secured to the annular metal support 36 as by means of an appropriately conductive cement layer 44 corresponding with the cement layer 32. The inertial member 34, is itself spaced from the housing member 20 and from the walls of the cavity 35 in the block 12, thus rendering the support element free to vibrate axially relative to the inertial member. When such vibration occurs, the crystal is strained in the shear mode thereby generating the electrical signals required of the accelerometer for detecting and indicating vibration or acceleration conditions of the work W.

For the purpose of providing electrical connection between the accelerometer unit 10 and the coaxial cable K leading to the amplifier 26 and recorder 28, or similar mechanism to measure acceleration or vibration, a flexible conductor lead 50 depends through the bore 22 and is then directed radially outward to an electrical connection at 52 with the metal inertial mass member 34. The conductor 50 is encased in insulation 53 which extends freely through a notch or passage 54 at the lower end of the sleeve 24 as indicated in each of FIGS. 1, 3 and 4. The upper end of the conductor 50 enters the lower end of a central or axial conductor member 55 which is hollow at its lower extremity to receive the conductor 50 which is there soldered in operative position, as indicated in FIG. 3 at 56. The central conductor 55 is mounted in an insulating sleeve 57 carried in the fitting 25 at the top of the bore 22, the lower portion of the axial member 55 being embedded in a resinous body of insulation 58 which is readily applied during construction of the unit. The upper end of the central axial member 55 also is hollow and provides a resilient split socket, as indicated at 60, to receive frictionally the end of a lead 62 in the cable K which is attached to the threaded fitting 25 by a cooperating female connector (not shown) as is common. The circuit with the amplifier is completed through a conductor member 64 typified by a sheath of the coaxial cable K which sheath is grounded through the threaded connector as diagrammatically indicated at 65.

With this arrangement, when the indicated connector on the end of the coaxial cable K is threaded onto the threaded fitting 25, the accelerometer parts are electrically connected with the reproducing means represented by the amplifier 26 and the recorder 28.

Also, when the body 20 is turned down tightly, as on its threads 21, and the lower end of the bearing sleeve 24 is thereby simultaneously bound onto the bottom of the cavity of the block 12, as through the bearing plate 42, the stress-relief gap 40 prevents the transfer of the effects of resultant stresses to the supporting ring 36 and the piezoelectric crystal 30.

The accelerometer unit 10 lends itself not only to installation in a block or outer housing such as represented by the block 12 in FIG. 1, but also to installation in any other housing such as indicated in FIG. 2 where additional units 10 are mounted on other axes in the same block to produce a triaxial accelerometer device.

In FIG. 3, the same unit 10 of FIGS. 1 and 2 is shown installed concentrically in a cylindrical block 72 corresponding generally with the block 12, but providing a relatively thin-walled surrounding housing 72a and providing an upstanding integral bottom-wall bearing portion 74, rather than the separate plate 42 of FIG. 1, upon which the lower end portion of the block sleeve 24 is seated. In this particular form, the lower portion of the block 72 is constructed for mounting on a piece of work through the medium of an insulating stud 75 provided with a threaded upper stud end 76 to be received in a threaded bore 77 in the block 72, and with a lower threaded stud end 78 to be received in a threaded bore of work to be tested. Here, insulation 79 is suitably installed between the heads 80 of the two stud parts.

In FIG. 4, there is illustrated the installation of the accelerometer unit 10 in a water-cooled mounting block 82 as distinguished from the air-cooled blocks 12 and 72 of the other figures. Here, the mounting block 82, into which the unit 10 is plugged, is externally threaded at 84 for reception in a channeled water-carrying outer block 85 which carries on its outer bottom wall an integral threaded mounting stud 86 for reception in a threaded mounting bore of work to be tested. The mounting block 82 is turned down on its threads 84 to bear upon a series of balls 88 retained by a ring 90 positioned in a water chamber 92 in the lower portion of the block 85. The chamber 92 receives cooling water by way of a helical channel 94 from a water supply nipple 95, the water being discharged by way of a second helical channel 96 to a water discharge nipple 98. These nipples are connected to water hoses 100 at their tops and are brazed at their bottoms as indicated at 102 into ports in a cover ring 104 which is in turn secured to the outer housing 85 as by soldering 106.

In this case, the annular support ring 136 is composed of ceramic, and a three-conductor coaxial cable K' and three-conductor connector are employed. The cable K' includes an inner tubular conductor 155 and a central conductor 155a, together with two typical surrounding shields which also are used as tubular conductors. The central conductor 155a is connected to the metallic inertial mass 134. The inner tubular conductor 155 is connected to a metallic ring plated on the ceramic carrier ring which communicates through conductive cement with the inner face of the crystal element 130, and the outermost conductor is formed by the threaded sleeve of the fitting 125. In this way, the crystal 130 and the inertial member 134 are electrically isolated from the blocks 82 and 84. Such three-conductor unit may be employed in place of the two-conductor units of FIGS. 1, 2, and 3, and thus eliminate the need for the special insulating means used with each of the accelerometers shown in those figures.

The accelerometers of this improvement are constructed to vibrate along their central axes which, as illustrated in FIGS. 1, 3, and 4, are their vertical axes, but, as illustrated in FIG. 2, may be horizontal or vertical axes, or may be otherwise. The supporting rings, crystals and inertial mass members are mounted in shear relationship, and the piezoelectric crystals are polarized with their polarization axes parallel to the central or housing axis. The vibrating force or force component is thus parallel to the polarization axis.

Piezoelectric crystal materials for such purposes are well known. One such material is the ceramic barium titanate in crystalline state. Others are lead metaniobate, cadmium, niobate, sodium niobate, a mixture of lead titanate and lead zirconate, and many others, including natural crystals such as quartz. The former materials have much higher dielectric constants than quartz, and they also have higher shear and compressive piezoelectric coefficients than quartz. While quartz is polarized in its natural state, the other materials specifically mentioned are not. The ceramic piezoelectric crystalline materials are readily polarized artificially by known methods for accelerometer use. In one such method, the materials are subjected to strong electric fields while the material is above its transition temperature. Upon cooling in the electric field, the material develops piezoelectric properties and in particular develops a polarization axis in a direction parallel to the electric field.

As will be apparent from the foregoing, there are provided by this invention desirable and highly effective accelerometer combinations employing sub-assemblies of annular configuration which may be mounted on various kinds of mounting blocks as may be desired. Furthermore, by employing a three-conductor fitting as described, a sub-assembly is provided that may be mounted on various kinds of supports without requiring the use of a special means for each such support to isolate the piezoelectric crystal from the support. Such structures also lend themselves fully to complete sealing of the piezoelectric crystalline structures within the respective housings, as well as to their enclosures in suitable damping media. In practice, the device is employed to detect signals having frequencies that are low compared with its resonant frequency. For example, in one case, an accelerometer having a resonant frequency of 30,000 c.p.s. was employed to detect accelerations in the range between 2 c.p.s. and 8,000 c.p.s. Also, since the cylinder that holds the crystal material and the base thereof may be machined at one time, very accurate perpendicularities and concentricities can be maintained, whereby to minimize cross-axis sensitivity.

Although only a limited number of embodiments of the invention have been specifically disclosed and described herein, it will be obvious that the invention is not limited thereto, but is capable of being embodied in other forms. Furthermore, the invention is not limited to the measurement of acceleration, but may be employed in instruments that measure force or pressure. Various changes which will suggest themselves to those skilled in the art, after becoming familiar with the invention, may be made in the material, configuration, details of construction and arrangement of the elements without departing from the invention. Furthermore, though the invention has been described solely with reference to a piezoelectric element operated in the shear mode, it will be understood that other arrangements of the piezoelectric element may be employed and that in some embodiments of the invention, electrical signal-generating means other than piezoelectric elements may be employed to detect the relative movement of the inertial member and the housing. Reference is therefore made to the claims to ascertain the scope of the invention.

I claim:
1. A plug-in accelerometer unit, including:
   a housing body provided peripherally with attachment means for mounting said body in a cavity in a mounting block having walls, which block is to be positioned on apparatus to be tested, said body having a central axis and a transverse face;
   rigid bearing means centrally carried by said body and extending below said transverse face for bearing at its bottom against a bottom wall of said mounting block;
   a carrier ring fixed to said body at said cavity in said face in spaced relation to said bearing means and extending below said face in position to lie above the bottom of said cavity;
   piezoelectric crystal means fixed upon the periphery of said carrier ring and suspended therefrom; and
   an annular mass member fixed upon the periphery of said crystal means and carried by and in contact only with said crystal means.

2. A plug-in unit as in claim 1 wherein said body has an axial bore and said bore contains an axial electrical conductor having a portion leading radially outward adjacent the lower end of said bore into electrical connection with said mass member.

3. An accelerometer unit including:
   a body member to be mounted in a cavity in a mounting block, said body member having a central axial bore;
   a concentric bearing sleeve integrally carried by said body member and extending below said body member to bear upon a bottom portion of said mounting block, and provided with an extension of said axial bore;

an annular piezoelectric crystal member peripherally attached to said sleeve;

and an annular mass member peripherally fixed in shear relationship upon said crystal member below and out of contact with said body member.

4. An accelerometer unit as in claim 3 wherein said crystal has a polarization axis parallel to the axis of said bore.

5. A plug-in measuring device including:

a body member to be mounted in a cavity in a mounting block, said body member having a central bore;

a bearing sleeve carried by said body member and extending below said body member to bear upon a bottom portion of said mounting block, and provided with an extension of said bore;

a carrier ring carried by said body member in spaced relation around said bearing sleeve; and an electric signal-generating member peripherally fixed on said carrier ring below and out of contact with said body member.

6. A measuring unit including:

a block having a cavity providing a bottom wall;

means to mount said block on apparatus to be tested;

and a plug-in device as in claim 5 secured in said cavity with the bottom end of said sleeve bound tightly into engagement with said bottom wall.

7. A plug-in measuring device including:

a body member having a bore along a predetermined axis and having external means for mounting and securing the body member in a cavity in a mounting block;

an annular piezoelectric element secured in the shear mode to a reduced portion of said body member; and conductor means extending out through said bore, said conductor means being connected to said element to detect radial electric fields generated in said element in response to axial shearing of said element.

8. A device as in claim 7 including an annular inertial member concentrically secured upon and resiliently carried by said piezoelectric element in a radially spaced position from said bore of said body member, whereby an electric potential is developed between radially spaced portions of said element in response to vibrations of said body member.

9. A measuring instrument including:

a mounting block having a cavity therein and a rigid bottom wall;

means to mount said block on apparatus to be tested;

a plug-in body member having a cylindrical surface and a central bore with a predetermined axis;

means securing said body member rigidly in said cavity of said mounting block;

an annular piezoelectric element secured upon said cylindrical surface of said body member and contiguous therewith, the upper and lower wall portions of said annular element being spaced from overlying wall portions of said body member and underlying bottom wall portions of said mounting block, and the outer annular wall of said annular piezoelectric element being free from contact with the surrounding wall of said cavity; and conductor means extending from said piezoelectric element out through said bore.

10. A plug-in measuring device as in claim 5 wherein said carrier ring is a ceramic insulating ring.

References Cited in the file of this patent
UNITED STATES PATENTS

| | | |
|---|---|---|
| 2,488,586 | Diemer | Nov. 22, 1949 |
| 2,536,802 | Fehr et al. | Jan. 2, 1951 |
| 2,808,522 | Dranetz | Oct. 1, 1957 |
| 2,917,642 | Wright et al. | Dec. 15, 1959 |